US008692172B2

(12) United States Patent
Preston et al.

(10) Patent No.: US 8,692,172 B2
(45) Date of Patent: Apr. 8, 2014

(54) COLD SHIELD APPARATUS AND METHODS

(75) Inventors: Kenneth G. Preston, Sahuarita, AZ (US); Aron Traylor, Tucson, AZ (US); David G. Jenkins, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 466 days.

(21) Appl. No.: 12/427,412

(22) Filed: Apr. 21, 2009

(65) Prior Publication Data
US 2010/0264252 A1 Oct. 21, 2010

(51) Int. Cl.
*F41G 7/22* (2006.01)
*G01J 1/42* (2006.01)
*F41G 7/00* (2006.01)
*G01J 1/00* (2006.01)

(52) U.S. Cl.
USPC ....... 244/3.16; 244/3.1; 244/3.15; 250/336.1; 250/338.1; 250/339.01; 250/339.14

(58) Field of Classification Search
USPC ......... 244/3.1–3.19; 342/61–66; 89/1.1, 1.11; 343/700 R, 753, 872, 873; 250/336.1, 250/338.1, 352, 339.01, 339.14; 216/83, 216/96, 97; 205/67, 80, 118, 122; 430/269, 430/311, 312
See application file for complete search history.

(56) References Cited

U.S. PATENT DOCUMENTS

| 3,780,661 | A | * | 12/1973 | Clark, Jr. | 343/872 |
| 3,925,783 | A | * | 12/1975 | Bleday et al. | 343/872 |
| 3,963,926 | A | * | 6/1976 | Borrello | 250/352 |
| 4,173,187 | A | * | 11/1979 | Steverding | 343/872 |
| 4,275,859 | A | * | 6/1981 | Bleday | 343/872 |
| 4,366,229 | A | * | 12/1982 | Freeman | 430/312 |
| 4,391,678 | A | * | 7/1983 | Freeman | 205/122 |
| 4,431,917 | A | * | 2/1984 | Gibbons | 250/352 |
| 4,443,303 | A | * | 4/1984 | Freeman | 205/122 |
| 4,446,372 | A | * | 5/1984 | Gurnee | 250/352 |
| 4,576,679 | A | * | 3/1986 | White | 216/97 |
| 4,677,443 | A | * | 6/1987 | Koetje et al. | 343/872 |
| 4,795,907 | A | * | 1/1989 | Maekawa et al. | 250/352 |
| 4,797,683 | A | * | 1/1989 | Kosowsky et al. | 343/872 |
| 4,812,655 | A | * | 3/1989 | Jungkman et al. | 250/352 |
| 4,814,620 | A | * | 3/1989 | Comey et al. | 250/352 |
| 4,872,019 | A | * | 10/1989 | Chow et al. | 343/753 |
| 4,898,435 | A | * | 2/1990 | Jungkman et al. | 250/352 |
| 4,914,299 | A | * | 4/1990 | Jungkman et al. | 250/352 |
| 4,916,461 | A | * | 4/1990 | Brazel | 343/872 |
| 4,972,085 | A | * | 11/1990 | Weber et al. | 250/352 |
| 5,075,553 | A | * | 12/1991 | Noble et al. | 250/352 |
| 5,167,386 | A | * | 12/1992 | Laquer et al. | 343/872 |
| 5,196,106 | A | * | 3/1993 | DuPree et al. | 205/67 |
| 5,225,931 | A | | 7/1993 | Stavroudis | |
| 5,258,621 | A | * | 11/1993 | Noble | 250/352 |
| 5,277,782 | A | * | 1/1994 | DuPree et al. | 205/67 |
| 5,315,116 | A | * | 5/1994 | DuPree et al. | 250/352 |
| 5,378,892 | A | * | 1/1995 | Levy et al. | 250/352 |

(Continued)

*Primary Examiner* — Bernarr Gregory

(57) ABSTRACT

A shield for use with a detector includes a first opening adjacent the detector, a second opening opposite the first opening along an optical axis intersecting the detector, and a field of view defined by the detector and the second opening. A shield body includes alternating curved profile regions and linear profile regions coaxially aligned along the optical axis. The curved profile regions have respective curved interior surfaces concave facing toward the second opening, and the linear profile regions have respective interior surfaces facing toward the first opening. In this way, specular reflections associated with stray light may be greatly reduced.

20 Claims, 3 Drawing Sheets

(56) References Cited

U.S. PATENT DOCUMENTS

| | | | |
|---|---|---|---|
| 5,434,413 A * | 7/1995 | Kennedy | 250/352 |
| 5,691,736 A * | 11/1997 | Hunn et al. | 343/872 |
| 5,982,339 A * | 11/1999 | Lalezari et al. | 343/872 |
| 5,994,702 A * | 11/1999 | Clynne et al. | 250/352 |
| 6,107,976 A * | 8/2000 | Purinton | 343/872 |
| 6,380,904 B1 * | 4/2002 | Ogawa | 343/872 |
| 6,424,308 B1 * | 7/2002 | Wu et al. | 343/753 |
| 6,430,941 B1 * | 8/2002 | Mordechai et al. | 250/352 |
| 7,332,720 B2 * | 2/2008 | Minarik et al. | 250/352 |
| 7,423,245 B2 * | 9/2008 | Baumgart | 244/3.1 |
| 2006/0208131 A1 * | 9/2006 | Baumgart | 244/3.1 |

* cited by examiner

COLD SHIELD APPARATUS AND METHODS

TECHNICAL FIELD

The present invention generally relates to light and infrared detector systems, and more particularly relates to cold shields coupled to such detector systems.

BACKGROUND

Cold shields are often incorporated into heat-seeking missiles and other such components to shield the detector from unwanted stray light transmissions. The cold shield allows the detector to "see" light and infrared radiation from optical surfaces within the imaging path defined by the cold shield's field of view while preventing the viewing of warm optical surfaces outside that field of view. By reducing stray light—i.e., light illuminating the detector that has not followed the imaging path—detector sensitivity and overall heat-seeking performance can be improved.

Stray light can be characterized by the number of ghost reflections or scatter interactions that occur before the light reaches the detector. Zero-order paths are the brightest stray light paths and travel straight to the detector without any scatter interactions. First-order paths scatter once before reaching the detector; second-order paths scatter twice, and so on. Higher order paths are generally of less concern as their effective energy has been reduced, and consequently cold shields primarily focus on reducing zero and first-order paths.

Known cold shields are unsatisfactory in a number of respects. For example, typical shields continued to include surfaces oriented to reflect light into the detector from various interior surfaces. Similarly, the placement and shape of curved surfaces within typical shields are often non-optimal with respect to reducing first-order scattering. Furthermore, as many cold shields are fabricated using multiple components, the internal blunt and rounded edges between such components are generally large and present a significant source of unpredictable scattering.

Accordingly, it is desirable to provide cold shields that are manufacturable and reduce stray light transmission. Other desirable features and characteristics of the present invention will become apparent from the subsequent detailed description and the appended claims, taken in conjunction with the accompanying drawings and the foregoing technical field and background.

BRIEF SUMMARY

In accordance with one embodiment of the present invention, a shield for use with a detector includes a first opening adjacent the detector; a second opening opposite the first opening along an optical axis intersecting the detector; a field of view defined by the detector and the second opening; a shield body comprising alternating curved profile regions and linear profile regions coaxially aligned along the optical axis; wherein the curved profile regions have respective curved interior surfaces concave facing toward the second opening; and wherein the linear profile regions have respective interior surfaces facing toward the first opening.

A method of forming a cold shield in accordance with another embodiment of the present invention includes: defining an allocated volume for the shield; defining a field of view and optical axis within the allocated volume based on the geometry of the detector; manufacturing a monolithic shield body constrained by the field of view and the allocated volume such that the shield body has a first opening, a second opening opposite the first opening along the optical axis, and alternating curved profile regions and linear profile regions coaxially aligned along the optical axis such that the curved profile regions have respective curved interior surfaces concave facing toward the second opening and the linear profile regions have respective interior surfaces facing toward the first opening.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to methods and apparatus for cold shield assemblies that are light, optimally designed for their predetermined allocated volumes, and reduce the effects of specular reflections associated with stray light. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to cold shields, detectors, optics, infrared radiation, missile systems, spray-forming, and the like need not, and are not, described in detail herein.

Figure 1:
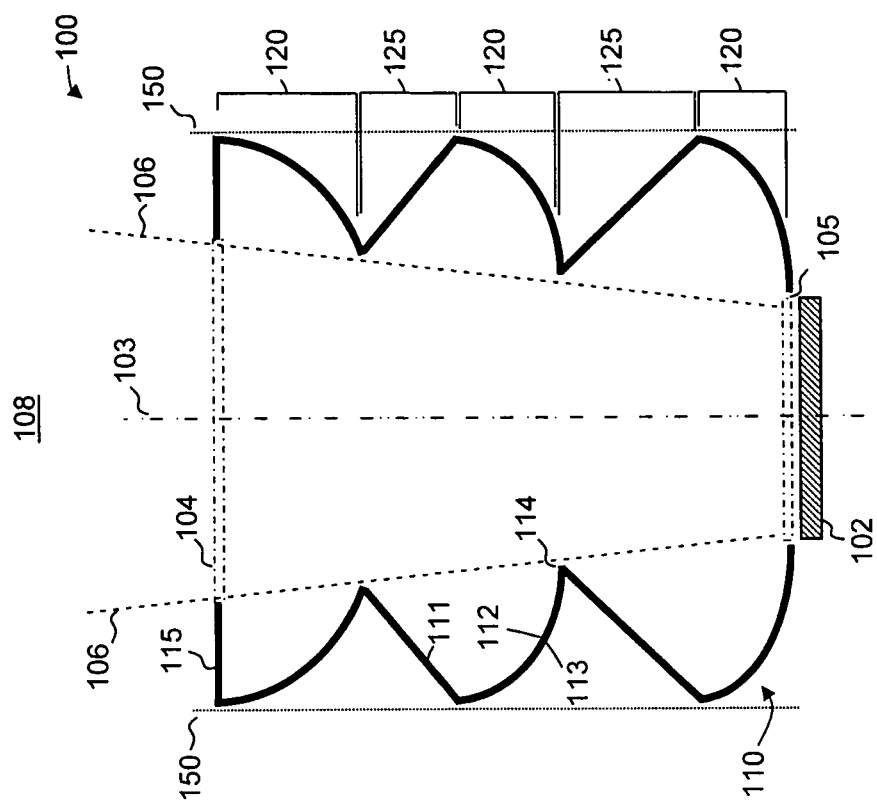
FIG. 1 is a conceptual cross-sectional view of a cold shield in accordance with one embodiment of the invention.

Referring now to FIG. 1, an exemplary shielded detector assembly 100 in accordance with one embodiment of the present invention generally includes a detector 102 suitably coupled to and aligned with a cold shield body ("shield body," or simply "body") 110. Shield body 110 defines an opening (or "entrance") 104 through which light and other electromagnetic radiation may enter, and another opening 105 (sometimes referred to as a "filter mount opening") opposite opening 104 and adjacent to detector 102 (and/or other optical components, such as lenses, filters, etc.) The planes defined by openings 104 and 105, as illustrated, are generally parallel and are orthogonal to optical axis 103.

A field of view ("FOV") 106 is defined by detector 102 and or opening 105 in conjunction with opening 104. That is, detector 102 "sees" radiation falling upon it from environment 108 within the volume defined by the geometry of detector 102 and opening 104, as is known in the art. Thus, in the simple case where detector 102 and opening 104 are circular, the resulting FOV 106 will be a conical frustum extending outward from detector 102. The present invention is not limited, however, to any particular combination of detector and opening shapes.

Depending upon design considerations, it may be desirable that cold shield body 110 fit within a predetermined allocated volume 150. In the illustrated embodiment, allocated volume 150 is cylindrical, but in practice allocated volume 150 may be any arbitrary three-dimensional shape that encloses FOV 106.

Detector 102 may be configured to detect infrared radiation, optical light, or any other radiation within the electromagnetic spectrum, depending upon the application. For the purposes of conciseness, however, the term "light" will be used herein without loss of generality. The nature of such detectors 102 and related electronics is known in the art, and need not be described further herein.

Shield body 110 includes alternating curved profile regions 120 and linear profile regions 125 coaxially aligned along optical axis 103. As illustrated, shield body 110 generally includes interior surfaces (e.g., 111 and 112) and exterior surfaces (e.g., 113). Curved profile regions 120 each have respective curved interior surfaces 112 that are concave facing toward opening 104, and linear profile regions 125 (and 115) each have respective interior surfaces 111 facing toward opening 105. As described in further detail below, the position, orientation, and shape of these surfaces with respect to field of view 106 prevent first-order scattering from linear profile regions 125 while increasing the amount of light that is reflected away from the detector by curved profile regions 120.

As is known in the art, linear surfaces facing toward detector 102 are generally referred to as "critical" surfaces (since in prior art shields such surfaces can be "seen" by the detector), and curved surfaces 112 are generally referred to as "illuminated" surfaces, since they are exposed to light from sources external to opening 104. Thus, the illustrated embodiment is advantageous in that light entering opening 104 will generally not reflect downward upon detector 102 from linear profile regions 125, while at the same time any light that falls upon curved profile regions 120 will be reflected either out of opening 104 or upon other surfaces within body 110.

Curved profile regions 120 may have a variety of shapes. In one embodiment, for example, curved profile regions 120 are solids of revolution defined by curvilinear profiles rotated about optical axis 103. Stated another way, curved profile regions 120 may correspond to a portion of a toroidal manifold. The curvilinear profiles defining such surfaces 112 might include circular arcs, elliptical arcs, and any other arbitrary planar curved shape. Successive curved profile regions 120 along optical axis 103 may be defined by the same type of shape or different types of shapes, and desired. That is, one curved profile region 120 may have a circular arc cross-section, while another might have a parabolic cross-section. Similarly, the focus or focii of each curved profile region 120, if such focii exist, may be consistent or may vary from region to region.

Linear profile regions 125 may be solids of revolution defined by a line segment rotated about optical axis 103. That is, linear profile regions 125 may be generally conical sections facing generally toward opening 105. The orientation, position, and length of each linear profile region 125 may vary.

While the cold shield bodies 110 described above are generally illustrated as solids of revolution, the present invention is not so limited, and comprehends a variety of surfaces, both symmetrical and asymmetrical. In general, the profile regions may be linear or curvilinear curves rotated about an arbitrary shape enclosing the optical axis.

Figure 2:
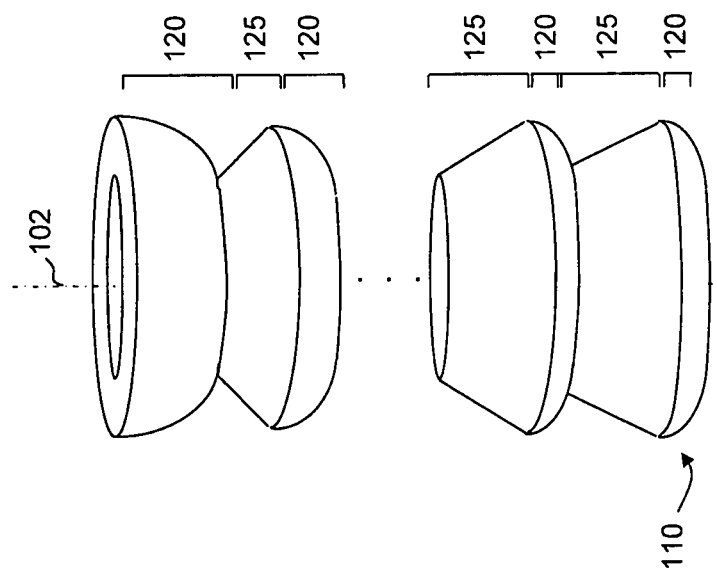
FIG. 2 is an isometric conceptual overview of a cold shield in accordance with various embodiments of the invention.

Furthermore, any number of regions 120, 125 may be used, depending upon applicable design parameters. As conceptually illustrated in the isometric view of FIG. 2, shield body 110 includes n curved profile regions ($C_1, C_2, \ldots, C_n$) and m linear profile regions ($L_1, L_2, \ldots, L_m$). The first curved profile region $C_1$ is adjacent to opening 105, and the nth curved profile region is adjacent to opening 104.

In various embodiments, n is greater than two. In certain desirable embodiments, however, n (as well as the length and slope of the various regions) is geometrically defined by field of view 106 and allocated volume 150.

Referring again to FIG. 1, in the illustrated embodiment, each curved profile region 120 intersects an adjacent linear profile region 125 at an edge 114 substantially located along field of view 106. That is, edges 114 preferably lie just outside of, but generally conform to the shape of, the field of view.

Figure 4:
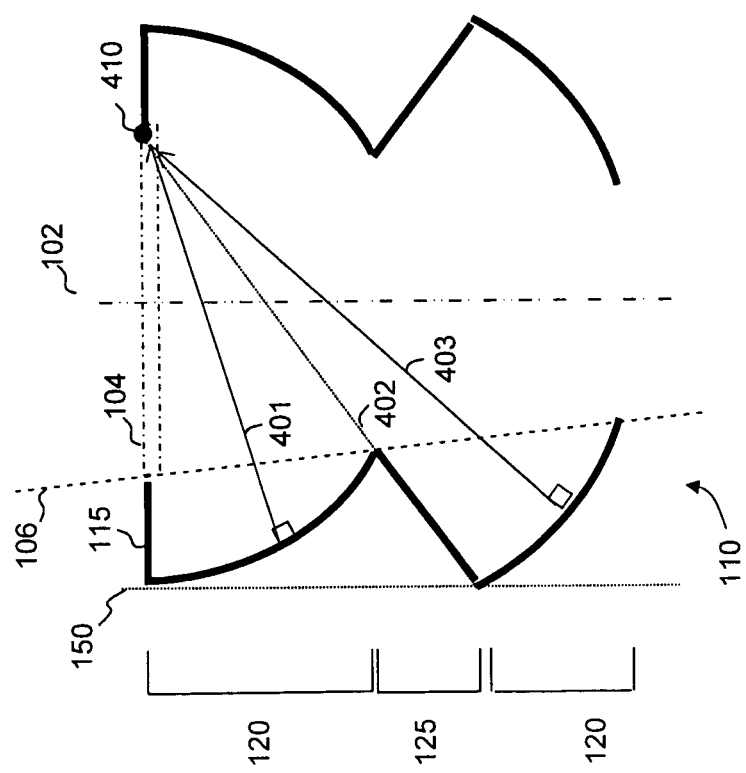
FIG. 4 depicts a close-up of a particular geometry for a cold shield as illustrated in FIG. 1.

In one embodiment, as shown in FIG. 4, linear profile regions 125 are defined by line segments collinear with a reference point 410 generally adjacent to opening 104 on the opposite side of shield body 100 (i.e., 180 degrees around the opening, as seen from the top). Thus, line 402, which intersects point 410, is generally collinear with the cross-section of linear profile region 125. Furthermore, in a particular embodiment the respective radiuses of curvature of curved profile regions 120 are such that their centers generally correspond to point 410, as indicated by normal vectors 401 and 403.

Referring again to FIG. 1, shield body 110 is preferably manufactured as a monolithic thin-walled structure, e.g., a homogeneous, one-piece structure with a substantially consistent thickness. In one embodiment, shield body 110 has a thickness of approximately 0.003 to 0.008 inches, preferably about 0.005 inches. Shield body 110 is preferably manufactured using a technique that allows relatively thin structures to be formed—e.g., spray-forming and the like.

It is also desirable for shield body 110 to exhibit a relatively high thermal conductivity. In one embodiment, for example, its thermal conductivity is above approximately 200.0 W/mK (at 300° K), and comprises a beryllium-bearing material, such as an aluminum-beryllium metal matrix composite (e.g., ALBEMET).

Figure 3:
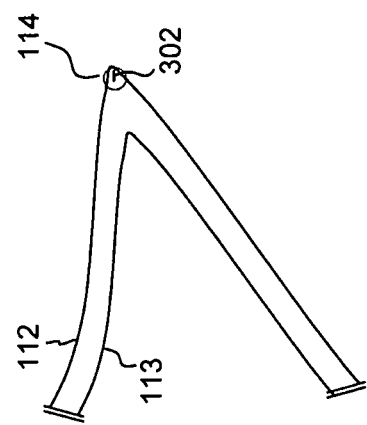
FIG. 3 is a close-up of an exemplary edge within a cold shield as illustrated in FIG. 1.

In one embodiment, the inner surfaces 111,112 of shield body 110 are coated with a low-emissivity "black" material layer, such as those known in the art. In accordance with another aspect of various embodiments, it may be desirable that any internal transitions between surfaces are relatively sharp, thereby reducing edge scattering within body 110. That is, referring to FIG. 3, the inner surface 112 of edge 114 preferably has a radius of curvature below a predetermined value—e.g., below about 0.002 inches in one embodiment.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A shield for use with a detector, the shield comprising:
    a first opening adjacent the detector;
    a second opening opposite the first opening along an optical axis intersecting the detector, wherein a field of view is defined by the detector and the second opening;
    a shield body comprising alternating curved profile regions and linear profile regions coaxially aligned along the optical axis;

wherein the curved profile regions have respective curved interior surfaces concave facing toward the second opening; and wherein the linear profile regions have respective interior surfaces facing toward the first opening.

2. The shield of claim 1, wherein the curved profile regions are solids of revolution defined by an arc rotated about an arbitrary shape enclosing the optical axis.

3. The shield of claim 1, wherein the linear profile regions an solids of revolution defined by a line segment rotated about an arbitrary shape enclosing the optical axis.

4. The shield of claim 1, wherein:
the shield body includes n curved profile regions;
the first curved profile region is adjacent the first opening; and
the nth curved profile region is adjacent the second opening.

5. The shield of claim 4, wherein n is greater than two.

6. The shield of claim 4, wherein n is geometrically defined by the field of view and an allocated volume for the shield.

7. The shield of claim 6, wherein each curved profile region intersects an adjacent linear profile region at an edge substantially located along the field of view.

8. The shield of claim 7, wherein the edge has a radius of curvature less than approximately 0.002 inches.

9. The shield of claim 7, wherein the linear profile regions are defined by line segments collinear with a reference point adjacent the second opening at an opposite side of the second opening.

10. The shield of claim 1, wherein the shield body is a thin-walled structure having a thermal conductivity greater than about 200 W/m-K.

11. The shield of claim 10, wherein the shield body comprises beryllium.

12. The shield of claim 10, wherein the shield body comprises a radiation-shielding material.

13. The shield of claim 10, wherein the thin-walled structure has a thickness of less than approximately 0.005 inches.

14. The shield of claim 1, further comprising a low-emissivity black coating on the interior surfaces.

15. A method of manufacturing a cold shield for use with a detector having an allocated volume, a field of view, and an optical axis, the method comprising:
forming a monolithic shield body;
forming, within the monolithic shield body, a first opening and a second opening opposite the first opening along the optical axis; and
forming, within the monolithic shield body, alternating curved profile regions and linear profile regions coaxially aligned along the optical axis such that the curved profile regions have respective curved interior surfaces concave facing toward the second opening and the linear profile regions have respective interior surfaces facing toward the first opening.

16. The method of claim 15, further including manufacturing the shield body such that each curved profile region intersects an adjacent linear profile region at an edge substantially located along the field of view.

17. The method of claim 15, wherein manufacturing the shield body includes spray-forming the shield body.

18. The method of claim 17, wherein the spray-forming includes spray-forming a beryllium-bearing material.

19. A missile assembly comprising:
a missile body;
a detector coupled to the missile body and configured to detect infrared radiation within a field of view external to the missile along an optical axis;
a cold shield having a first opening adjacent the detector, a second opening opposite the first opening along the optical axis, and a shield body comprising alternating curved profile regions and linear profile regions coaxially aligned along the optical axis;
wherein the curved profile regions have respective curved interior surfaces concave facing toward the second opening;
wherein the linear profile regions have respective interior surfaces facing toward the first opening; and
wherein the shield body is geometrically defined by the field of view and a predetermined allocated volume for the shield body.

20. The missile assembly of claim 19, wherein each curved profile region intersects an adjacent linear profile region at an edge substantially located along the field of view, and wherein the linear profile regions are defined by line segments collinear with a reference point adjacent the second opening on an opposite side of the opening.

* * * * *